Oct. 29, 1968   L. G. ALEXANDER   3,407,501
TEMPLATE FOR TRIMMING OF DENTAL CASTS
Filed Nov. 17, 1965   3 Sheets-Sheet 1
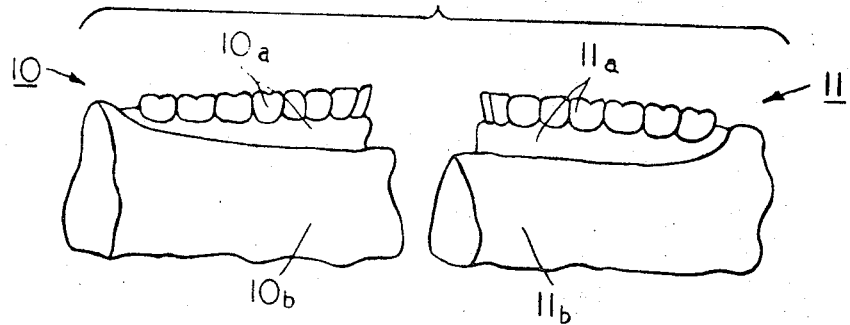
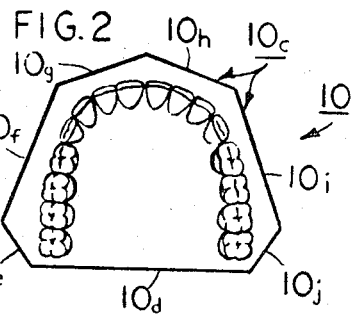
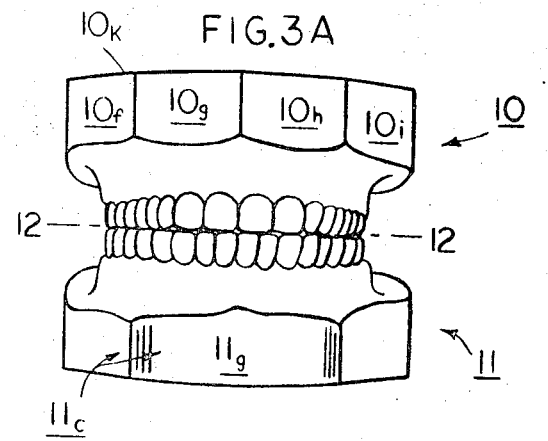
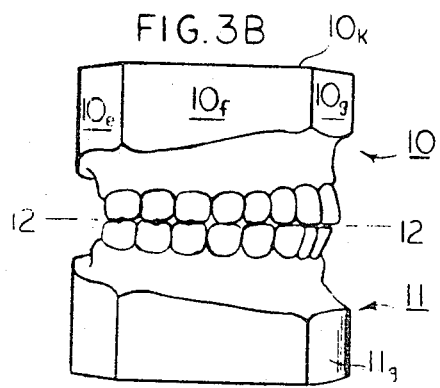
INVENTOR:
LAWRENCE G. ALEXANDER
by
Dike, Thompson, Bronstein & Mrose
ATTORNEYS

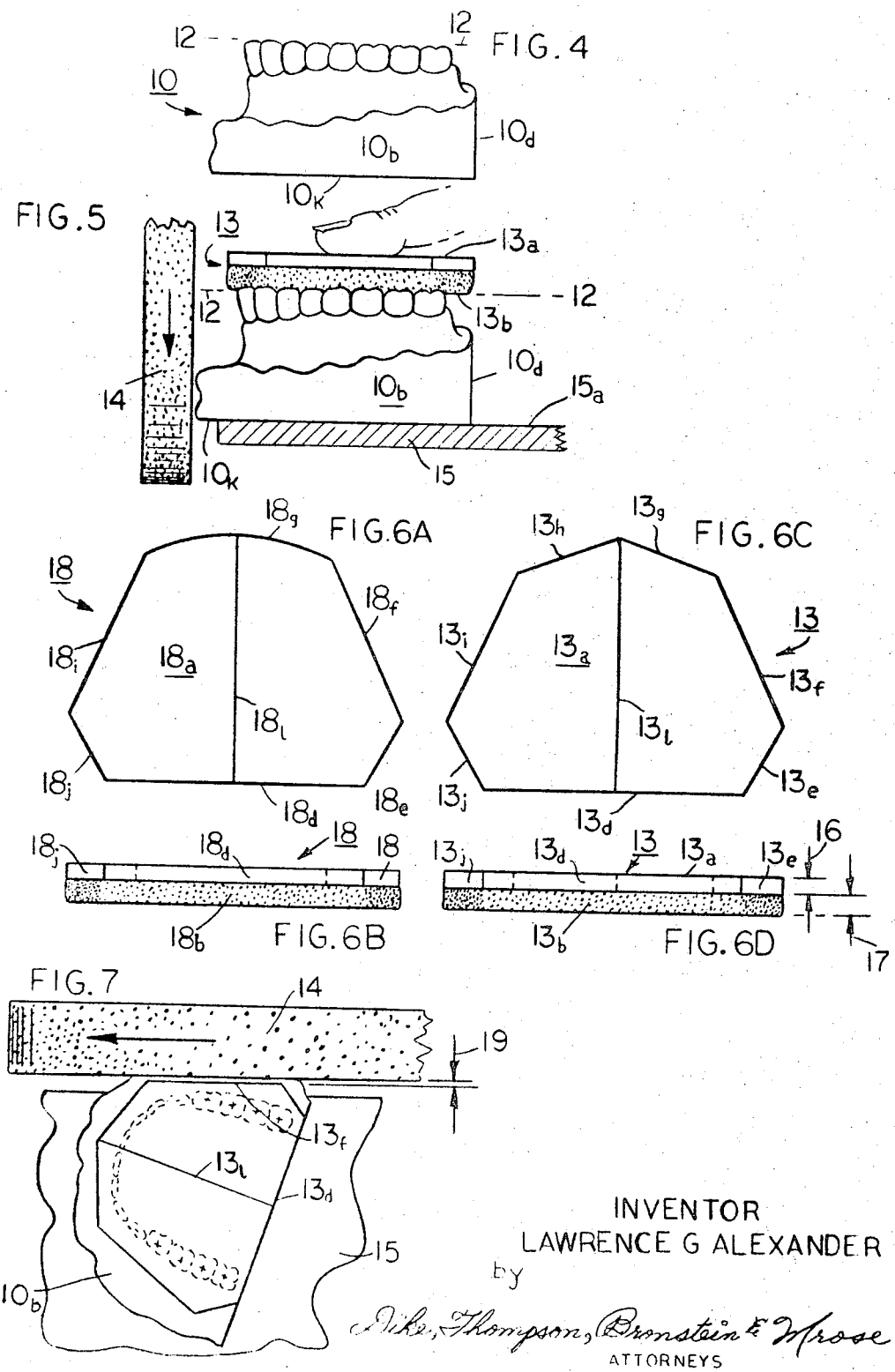

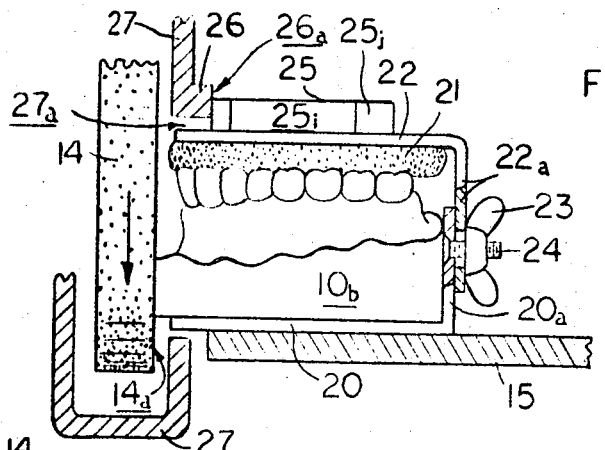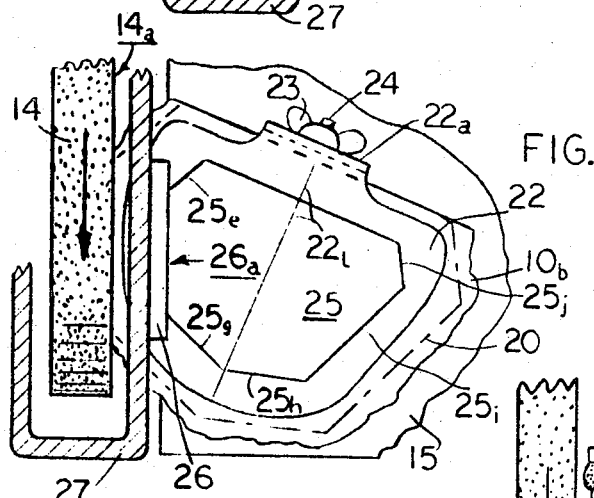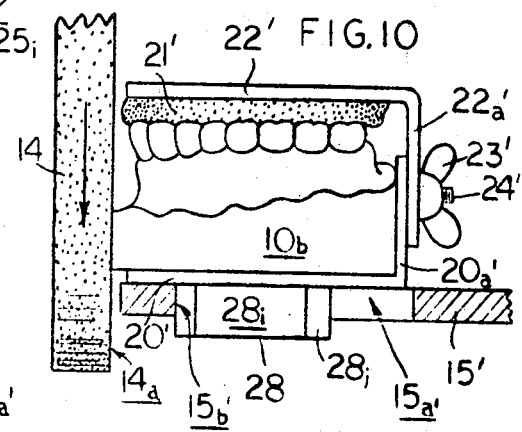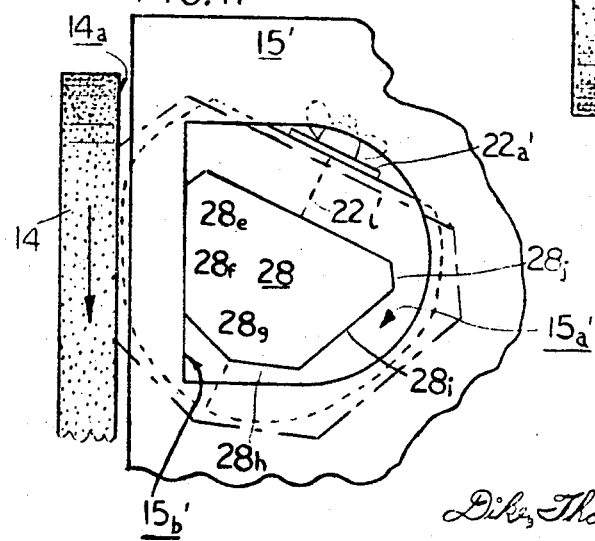

United States Patent Office 3,407,501
Patented Oct. 29, 1968

3,407,501
TEMPLATE FOR TRIMMING OF DENTAL CASTS
Lawrence G. Alexander, 1 Broad St.,
Lynn, Mass. 01902
Filed Nov. 17, 1965, Ser. No. 508,333
9 Claims. (Cl. 32—38)

ABSTRACT OF THE DISCLOSURE

In the trimming of art portions of a cast dental model used in orthodontics, a rigid movable template having a peripheral outline and geometry related to those desired for the model is employed as a guide for grinding, the rigid template being held fixedly in relation to the model by way of a thin resilient member engaged with the occlusal surfaces of the model.

---

The present invention relates to improvements in the shaping of dental models such as those used in the practice of orthodontics, and, in one particular aspect, to novel and improved model-trimming apparatus of simple and economical construction requiring relatively minor operator skill and yet promoting the precise and swift forming of art portions, or superstructures, of plaster mandibular and maxillary blocks used in orthodontic analyses and the like.

Conventional techniques in orthodontics involve the preparation and preservation of accurate anatomical models of each case under treatment, such that professional evaluations may be made of conditions prior to and during the course of the corrective dentistry. These record models are generally of a substantially permanent character, being cast in a material such as dental model plaster from the finely-detailed mouth impressions taken from patients in accordance with well-known procedures. For purposes of mechanical strength, ease of manipulation, and uniformity, the respective castings of maxillary and mandibular anatomy are each developed integrally with a rough mass of plaster out of which is to be formed a base, or so-called superstructure, the excess amounts of this base material being carefully trimmed away to exhibit predetermined standardized configurations and proportions which are both pleasing aesthetically and distinctively characteristic of the respective types of upper and lower anatomies. The properly trimmed base provides what is commonly termed the "art portion" of the model, and the remaining anatomical portion, including the teeth, alveolar process, and palate, must be precisely oriented in relation to prescribed surfaces of the trimmed base. Conventionally, the untrimmed fragile and awkwardly-proportioned castings have been shaped, with the aid of high-speed cutting or abrasive tools, to agree with mathematically- and geometrically-defined markings drawn directly upon various surfaces of the casting; this practice entails substantial labor and time, as well as a high degree of skill, artistic sense, and instinct, and generally involves certain markings which are necessarily obscured during the machining operations, such that the operator must frequently interrupt the material-removal process to inspect the progress being made and judge what further trimming of excess is required. Heretofore, the motorized grinding wheels used for such purposes have in some instances been equipped with steadyrest supports, and with associated angularly-adjustable guides and slides for convenient manipulation of the models; however these provisions have nevertheless not adequately resolved the difficulties alluded to. In accordance with the present teachings, substantially all of the critical base-trimming may be performed rapidly and precisely without calculations, measurements, and layout-marking of guidelines upon the castings, and without reliance upon conjecture or unusual skill and expertise, through the use of unique composite templates which are readily matched to and securely but non-injuriously held fixedly in position with the partly-shaped frangible castings and which visually establish the need for and physically regulate the extent of material removals.

It is one of the objects of this invention, therefore, to provide guide and support fixtures for the economical and expeditious precision-trimming of dental casts into forms which satisfy exacting professional standards.

Another object is to provide novel and improved model-trimming attachments, for use in orthodontics, which securely and without damaging effect establish the grinding limits for shaping of model superstructures.

A further object is to provide unique composite templates adapted to fit in a readily-determined alignment with semi-finished dental casts and to define the limits for further contouring thereof by a motorized material-removing tool.

Still further, it is an object to provide both manual and semi-automatic fixtures, including templates, for orienting and defining the grinding limits for dental casts, and thereby promoting rapid, uncomplicated and low-cost shaping of such items.

By way of a summary account of practice of this invention in one of its aspects, cast dental-plaster reproductions of mouth impressions, each including a relatively irregular mass of plaster which is to serve as the base or art portion for a different one of the respective finished maxillary and mandibular models, are prepared for trimming by first cutting the irregular masses to predetermined heights in relation to certain tooth cusps, in a conventional manner. With a planar base surface thus established, the usual flat posterior or heel surface of each model is then cut in a plane normal to the basal plane. When these operations are properly executed, parallelism is established between the basal planes of the models while their occlusal surfaces are in engagement, and their heel portions are substantially coplanar. Separate flat templates each having the prescribed angular measurements and outline for the maxillary and mandibular models are aligned in relation to the heels and mid-lines of the teeth for the respective models, and are secured in relation to them via a resilient foam material which establishes a firm hold without injuring the anatomical portions. The respective models, with their templates attached, are each separately pressed against the side of a high-speed abrasive wheel and are angularly adjusted until the outlines delineated by the templates are accurately reproduced on their superstructures, thereby yielding highly standardized trimming.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings, wherein:

FIGURE 1 illustrates mandibular and maxillary dental-plaster castings, prepared from mouth impressions, including base masses from which the art portions are to be cut into prescribed configurations;

FIGURE 2 is a plan view of a properly trimmed maxillary model;

FIGURE 3A provides a view, from the front, of mated trimmed maxillary and mandibular models;

FIGURE 3B provides a view, from the side, of the same mated models;

FIGURE 4 represents a model which has been prepared for trimming by machining a planar basal and posterior surfaces;

FIGURE 5 depicts a side view of the model of FIGURE 4, with a superpositioned composite template, being manipulated on a work table into material-removal relationship with a grinding wheel;

FIGURES 6A and 6B are plan and rear edge views, respectively, of a composite mandibular template;

FIGURES 6C and 6D are plan and rear edge views, respectively, of a composite maxillary template;

FIGURE 7 portrays the model and template assembly of FIGURE 5, from above, during a side-trimming operation;

FIGURE 8 is a side view, with portions in section, of a dental cast held within a trimming fixture including a top template and which is disposed to abut a stop surface fixed in relation to grinding machine structure;

FIGURE 9 provides a top view of the elements depicted in FIGURE 8, with the fixture turned to one side;

FIGURE 10 is a side view, with portions in section, of an orthodontic model held within a trimming fixture including a bottom template which is disposed to abut a stop surface fixed in relation to a grinding machine work table; and FIGURE 11 provides a bottom view of the elements depicted in FIGURE 10, with the fixture turned to one side.

As is portrayed in FIGURE 1, as-cast maxillary (upper) and mandibular (lower) dental-plaster castings 10 and 11, respectively, which are prepared from the usual mouth impressions of plaster, colloidal materials or the like, include not only the finely-detailed anatomical portions, 10a and 11a, but also, integrally cast therewith, relatively large and rough masses, 10b and 11b, of base or superstructure material from which the so-called "art" portions of the finished models are to be carved. When the superstructure of the maxillary model 10 has been properly trimmed to exhibit the characteristic outline 10c (FIGURE 2) for that type of record unit, it should possess seven smooth planar surfaces 10d through 10j all of which are perpendicular to a smooth planar base 10k which has been cut parallel to the occlusal plane 12–12 of the teeth (FIGURES 3A, 3B and 4). Angular relationships and relative lengths of all of sides, including the anterior sides 10g and 10h, lateral sides 10f and 10i, and posterior sides 10e and 10j, should be in accordance with well-established exacting standards for the profession. The mandibular model 11, which is customarily trimmed first and then occluded with the maxillary unit as an aid to heightwise sizing of the latter, is of a generally similar precision outline 11c except that the anterior surface 11g is arcuate. Model 10, in FIGURE 4, is shown readied for side trimming, with its posterior or heel surface 10d cut flat and normal to the pre-trimmed planar basal surface 10k; these two surfaces which are established in any accepted manner in predetermined relation to one another and to the anatomical portions of the model, serve importantly as references for the critical side trimming which is to be performed in completing the art portion.

In contradistinction to the usual practice of measuring angles and distances and making related markings at various places upon the unfinished model as guidelines for grinding operations, the present teachings are instead concerned with the grinding or other trimming away of excess lateral material under control of pre-formed composite templates which will mate and readily remain well engaged with the occlusal surfaces of the partly-formed models. The use of one unique composite trimming template, 13, for the maxillary model 10, is illustrated in FIGURE 5, wherein they cooperate with the rotated motorized cutting wheel 14 and proximately-spaced stationary work table 15 of a known type of model trimming machine wherein the work-supporting surface 15a of the table is held accurately perpendicular to the cutting face of the wheel. Water is commonly applied to the wheel surfaces during the cutting, such that any guide lines marked on the plaster model itself would quickly tend to become obscured. Templates 13 (FIGURES 5, 6C and 6D) includes both a stiff flat member 13a, having the desired geometric outline corresponding to that of the intended model "art" portion outline, and at least one relatively thin resilient layer 13b of foam rubber or the like bonded to at least one side of that member. The composite template has a heel portion 13d, and side portions 13e–13j, which correspond to the intended sides of model 10 identified in FIGURE 2 by the same letter subscripts. In one convenient practice, the template portion 13a comprises a plastic plate made of methyl methacrylate, such that any accidental encounters with the cutting wheel will not damage the latter; its thickness, 16, is sufficient to impart a substantial stiffness and to prevent unwanted deformations when operator finger pressures are applied to hold it it place on the model (FIGURE 5) during trimming. Various average sizes of such templates are provided, for use with models falling within predetermined size ranges, and they may be either directly molded, separately, or cut to the desired shape from a large sheet of stiff material. Resilient template portion 13b is yieldable and thick enough to accommodate itself to the occlusal surface contours of the model, and is yet thin enough example: up to about ¼ inch for dimension 17 of the foam rubber layer 13b in (FIGURE 6D) to suppress unwanted lateral movements of the template. Preferably though not necessarily, the foam rubber portion 13b is of about the same geometry as template portion 13a, and it may conveniently be adhesively secured to the latter. Composite mandibular template 18 (FIGURES 6A and 6B) is of similar construction, but is of course of a different contour involving an arcuate anterior surface 18g; the other subscripts designate portions which correspond to those of template 13. Importantly, both stiff template portions 13a and 18a are marked, as by scribing, with centerlines, 13l and 18l, respectively, on their top surfaces. These center lines are aligned, visually, at least with the mid points between the front teeth, and preferably also with the last molars of the model, before the operator commences pressing and holding the template against the model for the machine trimming. Ordinarily the model heel surface, such as 10d will be pre-formed and may simply be aligned with the corresponding heel portion 13d of the template, but in some practices the heel 10d may also be machined with the aid of the template.

A typical trimming operation is viewed from above in FIGURE 7. The operator manipulating the model and template exercises care to insure that a small space 19 is left between the wheel cutting face and the guide edges of the template, such that the re-usable template will not be worn away too quickly. In some instances, it is desirable that the model and template be held together without the operator finding it necessary to exert the mating pressure continuously, and this is accomplished with the aid of a special model clamping fixture such as that illustrated in FIGURES 8 and 9. There, the prepared model, having a planar basal surface 10k and normal heel surface 10d, rests upon a flat support member 20 having an upturned planar-surfaced heel-engaging portion 20a. The occlusal surfaces are engaged with a thin resilient (example: foam rubber) pad 21 fixed to the underside of a top support member 22 which has an integral downwardly-turned portion 22a disposed to abut with and to be clamped to the heel-engaging portion 20a via a fastener such as the wing-nut 23 and cooperating bolt 24. Atop and fixed with the support member 22 is a template 25 having the desired maxillary (or mandibular) outline; this template is smaller than the actual outline to which the base 10b of the model is to be trimmed, because it is designed and oriented to engage a stop member 26 which is fixed in relation to the wheel cutting face 14a and which is conveniently secured to or a part of the usual protective shroud 27 for the rotatable cutting wheel 14. Opening 27a in the wheel guard or shroud permits the model base and portions of the supports 20 and 21 to be brought in close to the wheel, for material-removals from the model base, while the template 25 restricts the extents of permissible removals by its engagements with the elongated stop front surface 26a which extends substantially parallel to the cutting wheel face 14a. The side stopping surfaces 25e–25j of template 25 correspond to surfaces 10e–10j for the trimmed model 10 (FIGURE 2), though on a reduced scale; the size of the template is less than full size by amounts equal to the distance between the wheel cutting face 14a and the stationary stop face 26a. Top support member 22 and lower support member 20, between which the model is sandwiched, may have any convenient outline which is less expansive than the intended geometrical outline for the model, while at the same time adequately supporting the model and template. Foam rubber layer 21 is of span sufficient to engage the occlusal surfaces of he model, and is preferably adhesively secured to the underside of top support member 22. Members 20 and 22 and template 25 may conveniently be formed of metal, and a further resilient layer may be introduced atop the member 20 to reduce the possibility of injury to the model when it is compressed between the upper and lower support members.

In an alternative embodiment, represented in FIGURES 10 and 11, the upper and lower supports 22' and 20', the clamp elements 23', 24' and the resilient layer 21', are substantially like those designated by corresponding members in FIGURES 8 and 9, and function similarly to clamp and hold the model (maxillary, in the illustrations). The template 28 is affixed to the underside of lower support member 20', however, whence it projects downwardly into a shaped opening 15a' in the work table 15'. The latter opening is enough larger than the template to permit it to be turned without binding, thereby accommodating selectable manual settings of the template guide edges 28e–28j against the elongated planar stop edge 15b' formed along the boundary of the opening closest to the parallel cutting wheel face 14a.

The reduction from full size of the central template 28 reflects the peripheral subtraction of distances equal to the distance between cutting face 14a and stop edge 15b'. Opening 15a' and the model lower support member 20' are of such relative sizes and shapes that the lower support member always tends to be well supported upon the top surface of the work table 15', without tilting into or dropping through the relatively small table opening for the miniature template. Clamping templates are provided in various sizes for both maxillary and mandibular models of the types discussed in connection with FIGURES 8–11. Center lines 22l and 22l' (on member 22') aid in aligning the models and fixtures.

Those skilled in the art will appreciate that numerous design changes may be introduced within the province of the present teachings, including substitutions of different materials, fabrication of certain parts in other shapes, and the introduction of other means for fastening or holding the model between supports. It should therefore be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. A dental-model trimming device comprising substantially rigid template means having a peripheral outline the geometry and proportions of which are related to desire geometry and proportions of the art portion of a cast dental model, a relatively thin broad-area resilient member, and means securing said template means and resilient member in a predetermined relationship to one another wherein said broad-area resilient member may engage the occlusal surfaces of a model while said template means outline is disposed symmetrically with the intended outline of the same model, whereby the sides of a dental model may be trimmed with reference to said template means while it is held fixed in relation to the model by way of said resilient member.

2. A dental-model trimming device as set forth in claim 1 wherein said template means is substantially flat and has a peripheral outline of substantially the same proportions as those of the intended art portion of a cast dental model, and wherein said resilient member comprises a foam rubber member bonded to one side of said template means.

3. A dental-model trimming device as set forth in claim 2 wherein said template means is a relatively thin and stiff plastic plate, and wherein said foam rubber member is sufficiently thin in relation to the lateral dimensions thereof to prevent substantial lateral displacements between the foam rubber member and the occlusal surfaces of a model in compressed relationship therewith.

4. A dental-model trimming device as set forth in claim 1 wherein said template means has a peripheral outline of proportions smaller than those of the intended art portion of a cast dental model, and wherein said means securing said resilient member and template means in said predetermined relationship comprises relatively broad-area upper and lower support members having peripheral outlines smaller than that of said intended art portion, and means for clamping said support members together with the model therebetween, said resilient member being bonded to the lower side of said upper support member, and said template means being positioned in fixed relation to and extending normally to the side of one of said members which is disposed away from a model held between said support members, whereby sides of said template means may be brought into engagement with mechanical stop fixed in relation to a cutting wheel to regulate the material-removals from the art portions of a cast dental model.

5. A dental-model trimming device as set forth in claim 4 wherein said clamping means extends between and clamps said support members together at the site of the heel portion of a cast dental model held therebetween.

6. Apparatus for trimming the art portions of cast dental models, of the type including a model-supporting work table substantially perpendicular to the face of a rotated cutting wheel, comprising substantially rigid template means having a peripheral outline the geometry and proportions of which are related to desired geometry and proportions of the art portion of a cast dental model, a relatively thin broad-area resilient member, and means securing said template means and resilient member in a predetermined relationship to one another wherein said broad-area resilient member may engage the occlusal surfaces of a model while said template means outline is disposed symmetrically with the intended outline of the same model, whereby the sides of a dental model rested on the work table may be trimmed by engagements with the face of the cutting wheel and with reference to said template means while it is held fixed in relation to the model by way of said resilient member.

7. Apparatus for trimming the art portions of dental models as set forth in claim 6 wherein said template means has a peripheral outline of proportions smaller than those of the intended art portion of a cast dental model, and wherein said means securing said resilient member and template means in said predetermined relationship comprises a pair of relatively broad-area support members having peripheral outlines smaller than that of said intended art portion, and means for clamping said support members together with the model and said resilient member therebetween and in engagement with the occlusal surfaces of the model, said template means being positioned in fixed relation to and extending normally to the side of one of said members which is disposed away from a model held between said support members, and further comprising a stop fixed in relation to the face of the cutting wheel in position to be engaged by the periphery of said template means when the template means and support members are advanced toward the cutting wheel on the work table.

8. Apparatus for trimming the art portions of dental models as set forth in claim 7 wherein said stop has an elongated stop surface substantially parallel with the cutting face of the wheel at a height above the work table in excess of the combined heights of said supports and a model held therebetween, and wherein the peripheral outline of said template means is reduced in size from that of the intended art portion of an amount equal to the distance between said stop surface and the face of the cutting wheel.

9. Apparatus for trimming the art portions of dental models as set forth in claim 7 wherein said stop has an elongated stop surface substantially parallel with the cutting face of the wheel and formed at the boundary of an opening in the work table, said side of said one of said members being substantially planar, except for said template means extending normally thereto, and having lateral dimensions in excess of those of the work table opening which prevent said one of said members from being depressed into the opening while said template means is downwardly disposed within the opening.

References Cited

UNITED STATES PATENTS

| | | | |
|---|---|---|---|
| 2,117,061 | 5/1938 | Helehan | 132—88.5 |
| 2,648,173 | 8/1953 | Carroll | 51—127 |
| 3,339,284 | 9/1967 | Ashby | 32—38 |

LOUIS G. MANCENE, *Primary Examiner.*

R. PESHOCK, *Assistant Examiner.*